US009910474B2

(12) United States Patent
Bru et al.

(10) Patent No.: US 9,910,474 B2
(45) Date of Patent: Mar. 6, 2018

(54) METHOD FOR OPTIMIZING MANAGEMENT OF STANDBY OF A MICROPROCESSOR ENABLING THE IMPLEMENTATION OF SEVERAL LOGICAL CORES AND COMPUTER PROGRAM IMPLEMENTING SUCH A METHOD

(75) Inventors: Xavier Bru, Claix (FR); Francois Wellenreiter, Grenoble (FR); Benoit Welterlen, Grenoble (FR)

(73) Assignee: BULL SAS, Les Clayes sous Bois (FR)

( * ) Notice: Subject to any disclaimer, the term of this patent is extended or adjusted under 35 U.S.C. 154(b) by 1018 days.

(21) Appl. No.: 13/698,631

(22) PCT Filed: May 13, 2011

(86) PCT No.: PCT/FR2011/051079

§ 371 (c)(1),
(2), (4) Date: Nov. 16, 2012

(87) PCT Pub. No.: WO2011/144847

PCT Pub. Date: Nov. 24, 2011

(65) Prior Publication Data

US 2013/0091368 A1 Apr. 11, 2013

(30) Foreign Application Priority Data

May 19, 2010 (FR) ..................................... 10 02102

(51) Int. Cl.
*G06F 1/32* (2006.01)

(52) U.S. Cl.
CPC ............ *G06F 1/3203* (2013.01); *G06F 1/329* (2013.01); *G06F 1/3287* (2013.01); *Y02B 60/1282* (2013.01); *Y02B 60/144* (2013.01); *Y02B 60/32* (2013.01)

(58) Field of Classification Search
CPC ........ G06F 1/32; G06F 1/3203; G06F 1/3228; G06F 1/3287; G06F 1/329; Y02B 60/1282; Y02B 60/144; Y02B 60/32
USPC ......................................... 713/300, 320, 322
See application file for complete search history.

(56) References Cited

U.S. PATENT DOCUMENTS

2004/0107369 A1 6/2004 Cooper et al.
2004/0107374 A1* 6/2004 Cooper ................ G06F 1/3228 713/320
2006/0026447 A1* 2/2006 Naveh .................. G06F 1/3203 713/322
2006/0069936 A1* 3/2006 Lint ...................... G06F 1/3203 713/320

(Continued)

*Primary Examiner* — Terrell Johnson
(74) *Attorney, Agent, or Firm* — Pillsbury Winthrop Shaw Pittman LLP

(57) ABSTRACT

The subject of the invention is in particular the optimization of standby management of a part of a microprocessor allowing implementation of at least two logic cores, said at least one microprocessor comprising means for placing at least one resource non common to said at least two logic cores on standby. After having determined (400) a desired standby state for each of said at least two logic cores, said desired standby state of one of said at least two logic cores is compared with the said desired standby state of the other of said at least two logic cores. In response to said comparison, instructions preparing for said placement on standby and/or allowing the restoration of said one of said at least two logic cores are launched (420).

10 Claims, 3 Drawing Sheets

(56) References Cited

U.S. PATENT DOCUMENTS

| | | | | |
|---|---|---|---|---|
| 2006/0236135 | A1* | 10/2006 | Jones | 713/300 |
| 2008/0209245 | A1* | 8/2008 | Becker et al. | 713/322 |
| 2010/0115304 | A1* | 5/2010 | Finkelstein et al. | 713/320 |
| 2011/0154090 | A1* | 6/2011 | Dixon | G06F 11/1658<br>713/502 |

* cited by examiner

METHOD FOR OPTIMIZING MANAGEMENT OF STANDBY OF A MICROPROCESSOR ENABLING THE IMPLEMENTATION OF SEVERAL LOGICAL CORES AND COMPUTER PROGRAM IMPLEMENTING SUCH A METHOD

CROSS REFERENCE TO RELATED APPLICATIONS

This application is a U.S. National Phase under 35 U.S.C. § 371 of International Application PCT/FR2011/051079, filed May 13, 2011, which designated the U.S., and which claims priority under 35 U.S.C. § 119 to France Patent Application Number 1002102, filed May 19, 2010. The disclosures of the above-described applications are hereby expressly incorporated by reference in their entireties.

BACKGROUND

Field of the Invention

The present invention concerns the management of standby in microprocessors and more particularly a method of optimizing management of standby of a microprocessor enabling the implementation of several logical cores, for example a microprocessor implementing a technology known under the name simultaneous multi-threading, in particular in the context of high performance computing, as well as a computer program implementing such a method.

Description of Related Technology

High Performance Computing (HPC) is being developed for university research and industry alike, in particular in technical fields such as aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (compute nodes), others for storing data (storage nodes) and one or more others manage the cluster (administration nodes). Each node is for example a server implementing an operating system such as Linux (Linux is a trademark). The connection between the nodes is, for example, made using Ethernet or Infiniband links (Ethernet and Infiniband are trademarks).

FIG. 1 is a diagrammatic illustration of an example of a topology 100 for a cluster, of fat-tree type. The latter comprises a set of nodes of general reference 105. The nodes belonging to the set 110 are compute nodes here whereas the nodes of the set 115 are service nodes (storage nodes and administration nodes). The compute nodes may be grouped together in sub-sets 120 called compute islands, the set 115 being called a service island.

The nodes are linked together by switches, for example hierarchically. In the example illustrated in FIG. 1, the nodes are connected to first level switches 125 which are themselves linked to second level switches 130 which in turn are linked to third level switches 135.

As illustrated in FIG. 2, each node generally comprises one or more microprocessors, local memories and a communication interface. More specifically, the node 200 here comprises a communication bus 202 to which there are connected central processing units (CPUs) or microprocessors 204;

components of random access memory (RAM) 206, comprising registers adapted to record variables and parameters created and modified during the execution of programs (as illustrated, each random access memory component may be associated with a microprocessor); and, communication interfaces 208 adapted to send and to receive data.

The node 200 furthermore possesses here internal storage means 212, such as hard disks, able in particular to contain the executable code of programs.

The communication bus allows communication and interoperability between the different elements included in the node 200 or connected to it. The microprocessors 204 control and direct the execution of the instructions of portions of software code of the program or programs. On powering up, the program or programs which are stored in a non-volatile memory, for example a hard disk, are transferred into the random access memory 206.

To improve the performance of each node, the microprocessors used are often multi-core microprocessors, that is to say microprocessors comprising several cores which can be used in parallel.

Furthermore, certain microprocessors comprise several logical cores, each physical core being adapted to implement several logical cores. This technology, called simultaneous multi-threading (or hyperthreading according to Intel's implementation, Intel being a trademark), enables several elementary processes, called threads, to be executed, practically in parallel, in a physical core of a microprocessor (the execution contexts are loaded at the same time and the threads share the executing kernel. A physical core implementing this technology is thus generally perceived as a dual-core by the logical layer utilizing the physical core.

A physical core implementing this technology comprises resources shared between the logical cores and resources specific to each logical core. The shared resources are typically execution units, cache memories and the bus interfaces. The specific resources are in particular the registers for data and instructions of the logical core, for segments and for control as well as the interrupt controller (called APIC, standing for Advanced Programmable Interrupt Controller).

However, whereas this technology makes it possible to significantly improve the performance of a microprocessor for particular applications, in particular image processing applications, it has been observed that the performance was only slightly improved, or even degraded, for other applications, in particular scientific computing applications. It is thus generally deactivated in the clusters used for high performance computing, which goes against the principle that the clusters are optimized to use their resources as well as possible.

SUMMARY OF CERTAIN INVENTIVE ASPECTS

One inventive aspect relates to a method for a computer for optimizing management of placing on standby of at least part of a microprocessor of the computer, the at least one microprocessor enabling the implementation of at least two logical cores, the at least one microprocessor comprising means for placing on standby of at least one resource common to the at least two logical cores, the method being implemented in a logical layer of the computer and comprising the following steps, determining a desired standby state for each of the at least two logical cores;

comparing the desired standby state of one of the at least two logical cores with the desired standby state of the other of the at least two logical cores; and, in response to the comparison, launching instructions preparing for the placing on standby and/or enabling the restoration of the one of the at least two logical cores after a period of standby.

In some aspects it is possible to implement several logical cores in the same microprocessor without appreciably degrading the performance of that microprocessor when a function for placing on standby of certain resources of the microprocessor is used.

According to a particular embodiment, the comparing step comprises the following:

estimating a standby state of the microprocessor according to the desired standby state of each of the at least two logical cores; and comparing the estimated standby state of the microprocessor with the desired standby state of the one of the at least two logical cores, the instructions preparing for the placing on standby and/or enabling the restoration of the one of the at least two logical cores being launched if the estimated standby state of the microprocessor corresponds to the evaluated standby state of the one of the at least two logical cores.

The number of comparisons between the desired states of standby of the logical cores is thus limited, in particular when more than two logical cores are implemented.

Advantageously, the method may further comprise detecting change of a desired standby state of at least one of the at least two logical cores, the steps of comparing and launching instructions only being carried out if a change in a desired standby state of at least the one of the at least two logical cores is detected. This detecting step is, preferably, directly implemented by an operating system to which the logical layer belongs.

According to a particular embodiment, the at least one microprocessor is a multi-core microprocessor, the at least two logical cores being implemented in the same physical core. The method according to the invention may thus be implemented in microprocessors of high performance and which are adapted, in particular, to the context of high performance computing.

Still according to a particular embodiment, the method further comprises a step of sending the desired standby state of the one of the at least two logical cores, the sending step being executed after the step of launching instructions. The implementation of the method according to the invention does not therefore require any modification of the processor used.

The logical layer preferably belongs to an operating system implemented in the computer.

The method preferably comprises an initial step of verifying activation of a mode enabling the implementation of logical cores in the microprocessor. Thus, in some aspects the method is only implemented opportunely.

The implementation of the at least two logical cores is, for example, based on a mode called simultaneous multi-threading.

Inventive aspects also relate to a computer program comprising instructions adapted for the implementation of each of the steps of the method described earlier when the program is executed on a computer and to an information storage means, removable or not, that is partially or totally readable by a computer or a microprocessor containing code instructions of a computer program for executing each of the steps of the method described earlier.

BRIEF DESCRIPTION OF THE DRAWINGS

The following detailed description, given by way of non-limiting example, relative to the accompanying drawings in which.

DETAILED DESCRIPTION OF CERTAIN INVENTIVE EMBODIMENTS

As indicated earlier, numerous microprocessors capable of being used in nodes of clusters implement the technology called simultaneous multi-threading (or hyperthreading according to the Intel implementation, Intel being a trademark) enabling logical cores to be created. When these microprocessors are used, this technology may be activated or not activated.

Figure 1:
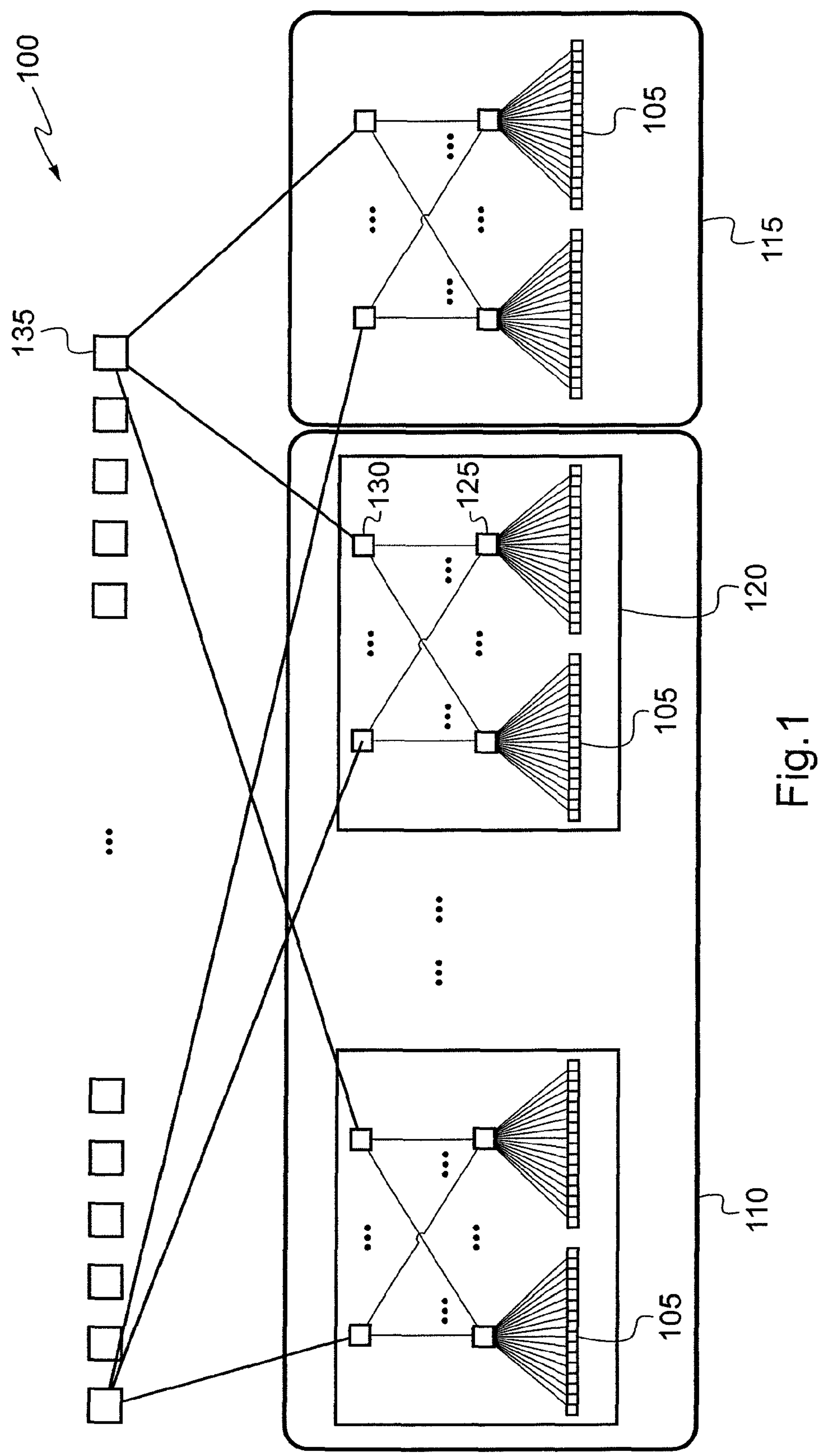
FIG. 1 illustrates an example of topology for a cluster.
Figure 2:
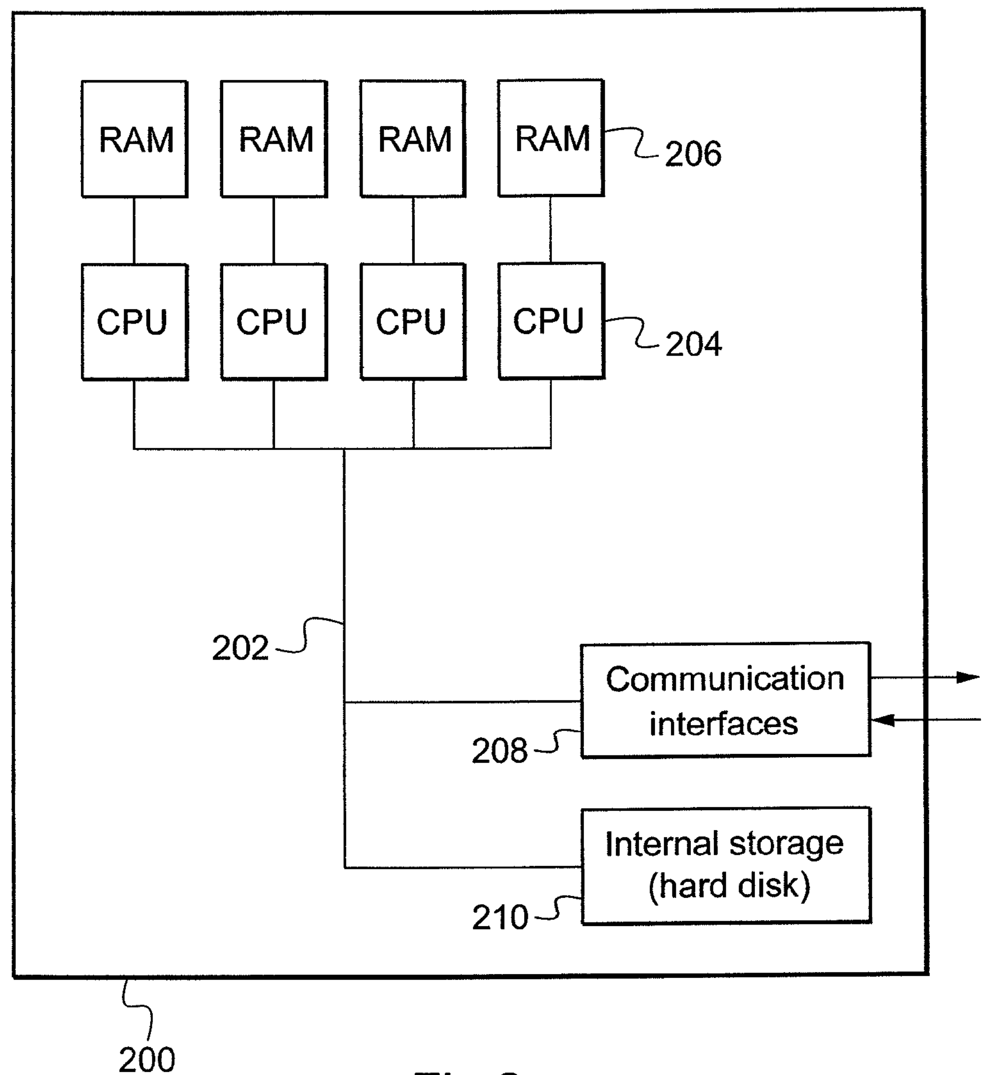
FIG. 2 illustrates an example of architecture for a node of a cluster.
Figure 3:
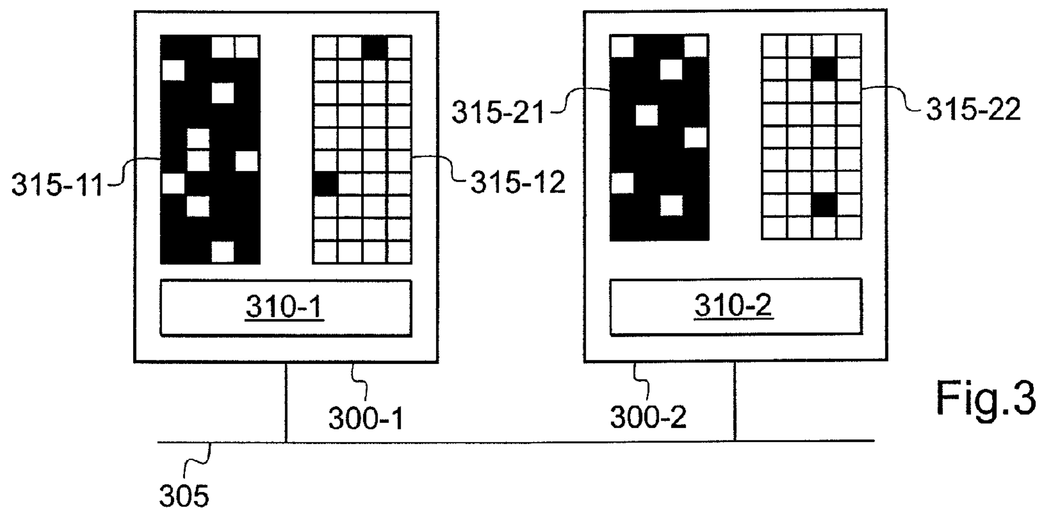
FIG. 3 is a simplified representation of the logical architecture of a microprocessor of a node belonging to a cluster, the microprocessor here comprising two cores each implementing two logical cores; and, FIG. 4 illustrates an example of an algorithm implemented by an operating system or, more generally, by a logical layer of a computer, for controlling a process for placing on standby a physical core of a microprocessor cooperating with that operating system or that logical layer according to the desired standby state associated with each logical core implemented in that physical core.

FIG. 3 is a simplified representation of the logical architecture of a microprocessor of a node belonging to a cluster, the microprocessor here comprising two physical cores each implementing two logical cores, that is to say a microprocessor in which simultaneous multi-threading has been activated, on execution of a high performance computing application. Each physical core here enables up to four instructions to be executed in the same cycle on account of the different execution units implemented in each physical core. Thus two logical cores may each execute up to four instructions according to the use made by the other core. In case of conflict, a conflict resolution mechanism attributes the resources concerned every other time to each logical core.

As illustrated, the physical cores 300-1 and 300-2 are linked by a system bus 305 to which there may be connected in particular a communication interface and a memory. Each physical core comprises execution units shared between the logical cores and an instruction register specific to each logical core.

Thus, the physical core 300-1 comprises a set 310-1 of execution units as well as the instruction register 315-11 linked to a first logical core of the physical core 300-1 and the instruction register 315-12 linked to a second logical core of the physical core 300-1. Similarly, the physical core 300-2 comprises a set 310-2 of execution units as well as the instruction register 315-21 linked to a first logical core of the physical core 300-2 and the instruction register 315-22 linked to a second logical core of the physical core 300-2.

It should be noted here that, for reasons of optimization, a logical core of a physical core is preferably assigned to the execution of instructions linked to the application of high performance computing being executed while the other logical core of the same physical core is advantageously associated with the execution of ancillary tasks of the operating system generally called demons. It follows that the load on a logical core is much greater than that on the other logical core of the same physical core. Thus, typically, the load on a logical core is close to one hundred percent while the load on the other logical core of the same physical core is approximately five percent.

It has been observed that the performance of a cluster is generally degraded when the simultaneous multi-threading mode has been activated, that is to say when logical cores are used, and a high performance computing application is executed. Analysis of this phenomenon has shown that this degradation in performance was in particular linked to the management of the functions of placing on standby of certain elements of the processors. The invention is directed to modifying those functions to mitigate that performance problem.

It is first of all to be recalled that for reasons of energy saving and temperature control of the circuits, modern microprocessors comprise standby functions which, according to the use of their resources, enable some of them to be stopped without significantly reducing, momentarily, the performance of those processors (only the resources that are not used or little used are generally concerned). The standby state of a microprocessor core is generally called "C-state" and referenced $C_i$ where i is an index varying from zero to n, n being typically equal to 8. In the state $C_0$, the core is active, as well as all the resources linked to it, whereas in the state $C_8$ the core is on complete standby. The intermediate states correspond to intermediate states of standby. By way of illustration, the level 1 cache memory of a physical core, called cache L1, is placed on standby when the physical core is placed in the standby state $C_3$.

The standby state of a physical core is often determined by the operating system, which sends it to the microprocessor comprising the physical core. The microprocessor then manages the placing on standby, or, on the contrary, the waking up, of the corresponding resources. Furthermore, before sending the microprocessor a standby state concerning a physical core, the operating system may launch instructions for preparation of placing on standby and/or for enabling the restoration of the physical core at the end of standby. Thus, for example, when a core has to pass from a standby state $C_2$ to a standby state $C_3$, the content of the corresponding level 1 cache memory (cache L1) is copied to another memory, typically in the associated level 2 cache memory. The physical core is only placed in state $C_3$ after that copy operation. After the physical core has passed from state $C_3$ to state $C_2$, the content of the level 1 cache memory is restored incrementally when the application accesses the corresponding data.

When the simultaneous multi-threading mode is active, that is to say when the logical cores are used, a desired standby state is associated by the operating system with each logical core. This desired standby state is determined by the operating system which sends it to the microprocessor which may then place on standby certain resources according to the desired states of standby received. When the desired standby state of a logical core is different from that of another logical core, the standby state applied by the microprocessor to the physical core is that whereby the most resources are active. In other words, the standby state $C_i$ in which is placed a physical core comprising two logical cores of which the desired standby states are $C_j$ and $C_k$, respectively, is determined in the following way, $$C_i = \begin{Bmatrix} C_j & \text{if } j \leq k \\ C_k & \text{if } j > k \end{Bmatrix}$$

However, it has been observed that even if the standby state of a physical core does not change on account of the desired standby state of each of the logical cores employed in that physical core, instructions preparing for the placing on standby and/or enabling the restoration of a logical core may be carried out prior to the placing on standby. This phenomenon results from the fact that if the desired standby state of the logical cores is determined by the operating system, the decision to change the state of the physical core is taken by the microprocessor comprising the physical core, independently of the operating system. Yet, the execution of instructions for preparation of placing on standby and/or enabling the later restoration of a logical core disturbs the physical core. Thus, for example, when the desired standby state of a logical core passes from $C_2$ to $C_3$, the content of the level 1 cache memory is copied into another memory, which disturbs the level 1 cache memory in relation to other logical cores using that level 1 cache memory. This results in a performance drop for those logical cores.

Some inventive embodiments thus consist, in particular, of launching the instructions preparing for the placing on standby and/or enabling the restoration of a logical core only according to an estimated standby state of the physical core, that is to say according to the desired standby state of each logical core of a physical core and not solely according to the desired standby state of the logical core considered. In other words, the invention is directed to simulating in the operating system the mechanism for deciding upon placing a physical core on standby according to the desired standby state of the logical cores implemented in the physical core.

Figure 4:
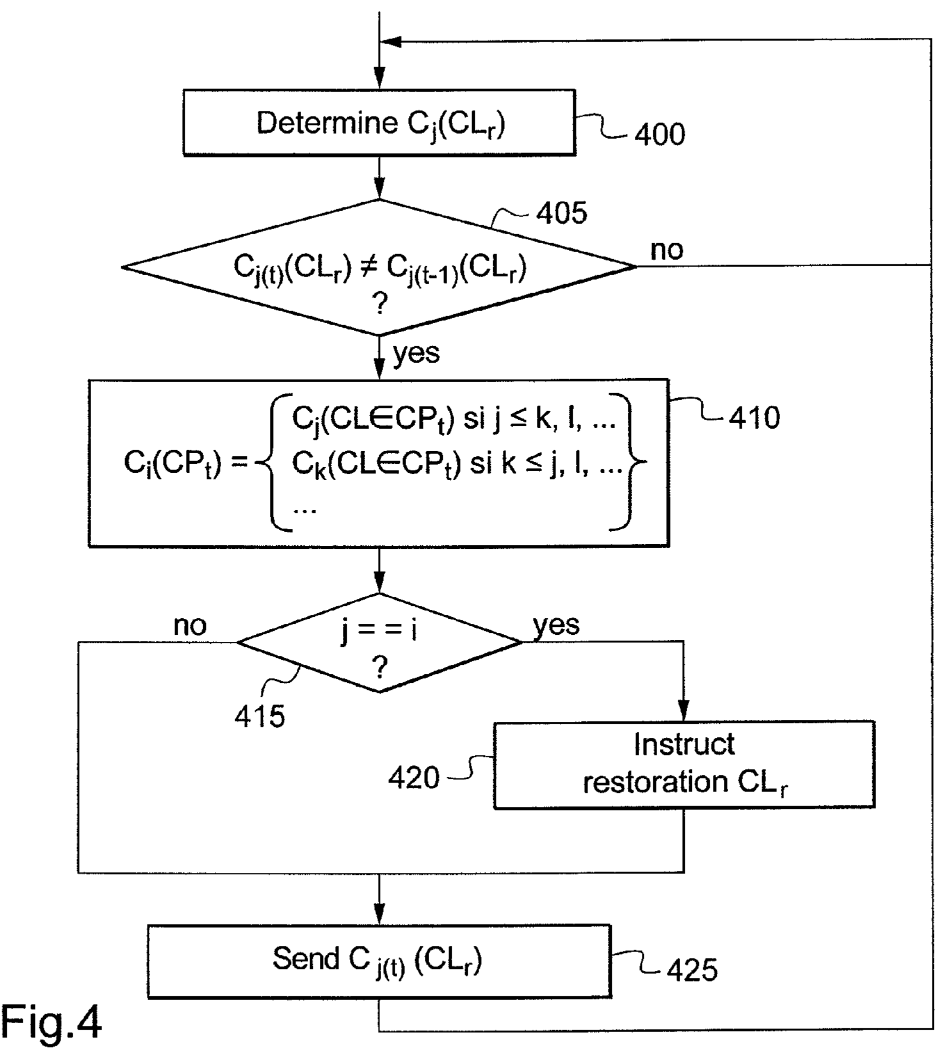

FIG. 4 illustrates an example of an algorithm implemented by an operating system or, more generally, by a logical layer of a computer, for controlling a process for placing on standby a physical core of a microprocessor cooperating with that operating system or that logical layer according to the desired standby state associated with each logical core implemented in that physical core.

It should be noted that the algorithm illustrated in FIG. 4 is preferably only implemented if the simultaneous multi-threading has been activated. Thus, an initial step (not represented) consists of verifying the activation of that mode.

After having determined a desired standby state $C_{j(t)}(CL_r)$ of a logical core $CL_r$ at a time t (step 400), a test is carried out (step 405) to determine whether that desired standby state has changed relative to the desired standby state of that logical core at a previous time (t−1), denoted $C_{j(t-1)}(CL_r)$. These steps of evaluating a desired standby state and of determining a change in a desired standby state are similar to those implemented in conventional systems. They are in particular based on the analysis of the instructions to be executed by the logical cores considered.

If a change in desired standby state of the logical core $CL_r$ is detected, the standby state of the physical core $CP_t$ in which the logical core $CL_r$ is implemented is estimated (step 410). By way of illustration, the estimated standby state $C_i(CP_t)$ of a physical core $CL_t$ corresponds to that whereby the most resources are active, that is to say the desired standby state $C_{0 \ldots n}$ the index of which is the smallest for a logical core implemented on the physical core. Naturally, the model for estimating the standby state of a physical core must be in accordance with that really implemented in the physical core itself.

A test is then carried out (step 415) to determine whether the desired standby state $C_j(CL_r)$ of the logical core $CL_r$ is the same as the estimated standby state of the physical core $CP_t$, that is to say whether the indices i and j are equal. In the affirmative and if the logical core $CL_r$ is to be placed in a deeper standby state than the previous standby state, the operating system (or the logical layer) launches instructions for preparation of placing on standby and/or for enabling the later restoration of the logical core at the end of standby (step 420). This step consists for example in launching an operation of copying contents of registers. The desired standby state $C_j(CL_r)$ is then sent to the processor (step 425) which, according to the desired standby state of the other logical cores implemented on the physical core $CP_t$ implementing the logical core $CL_r$, modifies or does not modify the standby state of that physical core.

If the desired standby state $C_j(CL_r)$ of the logical core $CL_r$ is not the same as the estimated standby state of the physical core $CP_t$, no instruction for preparation of placing on standby and/or enabling the restoration of the logical core $CL_r$ at the end of standby is sent to the microprocessor. However, as illustrated in FIG. 4, the desired standby state $C_j(CL_r)$ of the logical core $CL_r$ may nevertheless be sent to the microprocessor although this step is not necessary where that new desired standby state does not modify the standby state of the corresponding physical core.

According to a particular embodiment, the algorithm illustrated in FIG. 4 may be implemented in an operating system kernel used, for example in a Linux kernel. The interception of the transfer function of a standby state of a logical core to the microprocessor then makes it possible to launch or not launch the instructions for preparation of placing on standby and/or enabling the restoration of the logical core according to the estimated standby state of the physical core implementing that logical core, that estimation being performed on the basis of the state of all the logical cores implemented by that physical core.

Furthermore, although the algorithm described with reference to FIG. 4 is directed to comparing a desired standby state of a logical core with an estimated standby state of the logical core in which it is implemented, it is also possible, in equivalent manner, to compare the desired states of standby of logical cores implemented in the same physical core to determine whether instructions for preparation of placing on standby and/or enabling the later restoration of logical cores are to be executed.

By way of illustration, when two logical cores are implemented in the same physical core, the desired standby state of the first logical core is compared with that of the second. Thus, if the standby state and the desired standby state of the first logical core are C1, if the standby state of the second logical core is C1 and if the desired standby state of the second logical core is C2, no instruction for preparation of placing on standby and/or enabling the later restoration of the second logical core is executed since the standby state of the physical core on which are implemented the logical cores is not modified. On the contrary, if the standby state of the first and second logical cores is C1 and if the desired standby state of the first and second logical cores is C2, instructions for preparation of placing on standby and/or enabling the later restoration of the first and second logical cores are executed since the standby state of the physical core on which are implemented the logical cores is modified.

While the above embodiments have been described with reference to the accompanying drawings, it is to be understood that the present disclosure is not limited to the disclosed embodiments, but, on the contrary, is intended to cover various modifications and equivalent arrangements included within the spirit and scope of the appended claims.

The invention claimed is:

1. A computerized method of optimizing management of placing on standby of at least part of a microprocessor of a computer while maintaining operation of the computer, the at least one microprocessor enabling the implementation of at least two logical cores, the at least one microprocessor being configured to place on standby of at least one resource common to the at least two logical cores, the method comprising:

determining a desired standby state for each of the at least two logical cores, the standby state of the at least two logical cores being independent of a standby state of the computer;

comparing the desired standby state of one of the at least two logical cores with the desired standby state of the other of the at least two logical cores;

determining an effect on the resource common to the at least two logical cores of placing one of the logical cores on standby; and in response to the comparison and the determining of the effect on the common resource, launching instructions preparing for the placing on standby and/or enabling the restoration of the one of the at least two logical cores after a period of standby, if and only if the placing on standby and/or enabling the restoration of the one of the at least two logical cores does not produce a performance drop in operation of the resource common to the at least two logical cores, wherein the method is implemented in a logical layer of the computer.

2. The method according to claim 1, wherein the comparing comprises:

estimating a standby state of the microprocessor according to the desired standby state of each of the at least two logical cores; and comparing the estimated standby state of the microprocessor with the desired standby state of the one of the at least two logical cores, the instructions preparing for the placing on standby and/or enabling the restoration of the one of the at least two logical cores after a period of standby being launched if the estimated standby state of the microprocessor corresponds to the evaluated standby state of the one of the at least two logical cores.

3. The method according to claim 1, further comprising detecting change of a desired standby state of at least one of the at least two logical cores, the comparing and launching instructions only being carried out if a change in a desired standby state of at least the one of the at least two logical cores is detected.

4. The method according to claim 1, wherein the at least one microprocessor is a multi-core microprocessor, the at least two logical cores being implemented in the same physical core.

5. The method according to claim 1, further comprising sending the desired standby state of the one of the at least two logical cores, the sending being executed after the launching instructions.

6. The method according to claim 1, wherein the logical layer belongs to an operating system implemented in the computer.

7. The method according to claim 1, comprising an initial step of verifying activation of a mode enabling the implementation of logical cores in the microprocessor.

8. The method according to claim 1, wherein the implementation of the at least two logical cores is based on a mode called simultaneous multi-threading and the desired standby states of the at least two logical cores are desired states of the at least two logical cores during continued execution of a computing application.

9. A non-transitory computer readable medium comprising instructions that when executed by a processor perform a computerized method of optimizing management of placing on standby of at least part of a microprocessor of a computer while maintaining operation of the computer, the at least one microprocessor enabling the implementation of at least two logical cores, the at least one microprocessor being configured to place on standby of at least one resource common to the at least two logical cores, the method comprising:

determining a desired standby state for each of the at least two logical cores, the standby state of the at least two logical cores being independent of a standby state of the computer;

comparing the desired standby state of one of the at least two logical cores with the desired standby state of the other of the at least two logical cores;

determining an effect on the resource common to the at least two logical cores of placing one of the logical cores on standby; and in response to the comparison and the determining of the effect on the common resource, launching instructions preparing for the placing on standby and/or enabling the restoration of the one of the at least two logical cores after a period of standby, if and only if the placing on standby and/or enabling the restoration of the one of the at least two logical cores does not produce a performance drop in operation of the resource common to the at least two logical cores, wherein the method is implemented in a logical layer of the computer.

10. A computer system for optimizing management of placing on standby at least one microprocessor, comprising:

the at least one microprocessor enabling the implementation of at least two logical cores, the at least one microprocessor being configured to place on standby of at least one resource common to the at least two logical cores and being implemented in a logical layer of a computer and being configured to execute software that:

determines a desired standby state for each of the at least two logical cores;

compares the desired standby state of one of the at least two logical cores with the desired standby state of the other of the at least two logical cores, the standby state of the at least two logical cores being independent of a standby state of the computer;

determines an effect on the resource common to the at least two logical cores of placing one of the logical cores on standby; and in response to the comparison and the determination of the effect on the common resource, launches instructions preparing for the placing on standby and/or enabling the restoration of the one of the at least two logical cores after a period of standby, if and only if the placing on standby and/or enabling the restoration of the one of the at least two logical cores does not produce a performance drop in operation of the resource common to the at least two logical cores.

* * * * *